(No Model.)

J. N. COREY.
VEHICLE SEAT LOCK.

No. 400,640. Patented Apr. 2, 1889.

Witnesses.
A. Ruppert,
H. A. Daniels

Inventor:
James N. Corey,
Per
Thomas R. Simpson,
Atty.

N. PETERS, Photo-Lithographer, Washington, D. C.

UNITED STATES PATENT OFFICE.

JAMES N. COREY, OF CONNEAUTVILLE, PENNSYLVANIA.

VEHICLE-SEAT LOCK.

SPECIFICATION forming part of Letters Patent No. 400,640, dated April 2, 1889.

Application filed September 25, 1888. Serial No. 286,367. (No model.)

*To all whom it may concern:*

Be it known that I, JAMES N. COREY, a citizen of the United States, residing at Conneautville, in the county of Crawford and State of Pennsylvania, have invented certain new and useful Improvements in Vehicle-Seat Locks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to make a vehicle-seat lock which may allow the seat to be easily and quickly attached or detached.

Figure 1:
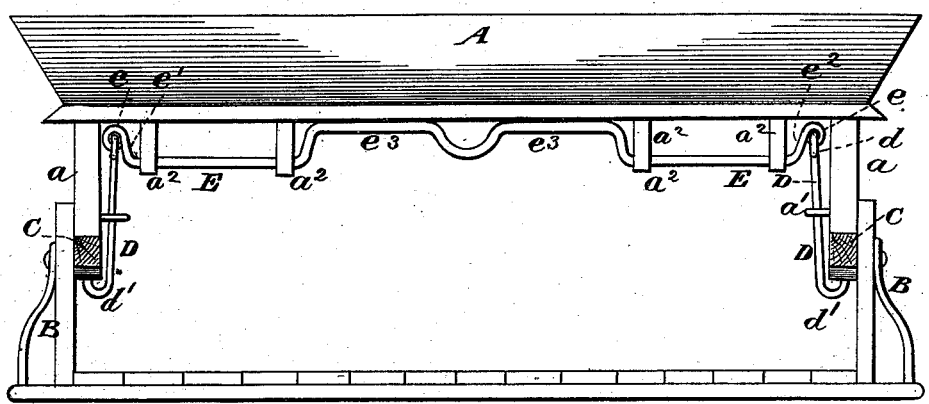
Figure 2:
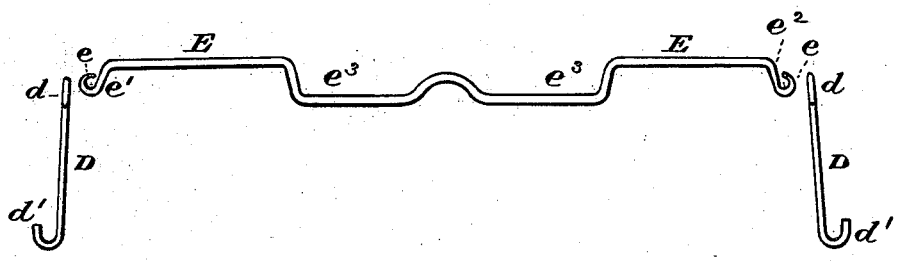

Figure 1 of the drawings is a rear elevation showing my invention applied, and Fig. 2 a detail view of the torsion-spring and coupling-hook.

In the drawings, A represents a vehicle-seat with the subjacent arms $a$ $a$, and B the body-standards, to which are attached the inside rails, C, to support said arms. On the arms $a$, I fasten the guide-rings $a'$ for the rods D D, which are provided with two end hooks, $d$ $d'$, arranged on opposite sides thereof.

E is the torsion-spring which I employ to hold the seat A in place, and which is preferably made of wire, with the end loops, $e$ $e$, cranks $e'$ $e^2$, and middle bail, $e^3$. The rods D catch in the loops $e$ with one hook, $d$, and with the other hook, $d'$, catch upon the under side of the rail C. The torsion-spring E has its bearings in the seat-hangers $a^2$, while the median bail $e^3$ rests against the bottom of the seat. By this means the seat is securely held to the body of the vehicle, while it may be quickly attached or detached.

Having thus described all that is necessary to a full understanding of my invention, what I claim as new, and desire to secure by Letters Patent, is—

In vehicle-seat locks, the torsion-spring E, having its bearings in the seat-hangers $a^2$, and provided with the end loops, $e$, cranks $e'$ $e^2$, and bail $e^3$, in combination with the rods D D, having reversed end hooks to connect with the loops $e$ and rails C, substantially as shown and described.

In testimony whereof I affix my signature in presence of two witnesses.

JAMES N. COREY.

Witnesses:
L. C. GROW,
F. L. COREY.